US00RE36401E

United States Patent [19]

Fitzpatrick et al.

[11] E Patent Number: Re. 36,401

[45] Reissued Date of Patent: Nov. 23, 1999

[54] TANDEM ROTOR TURBINE METER AND FIELD CALIBRATION MODULE

[75] Inventors: James J. Fitzpatrick, DuBois; Daniel W. Peace, Punxsutawney, both of Pa.

[73] Assignee: M & FC Holding Company, Inc., Wilmington, Del.

[21] Appl. No.: 08/926,192

[22] Filed: Sep. 9, 1997

Related U.S. Patent Documents

Reissue of:

[64] Patent No.: 5,473,932
Issued: Dec. 12, 1995
Appl. No.: 08/125,344
Filed: Sep. 22, 1993

U.S. Applications:

[63] Continuation of application No. 07/788,826, Nov. 7, 1991, abandoned.

[51] Int. Cl.[6] ..... G01F 25/00; G01F 7/00

[52] U.S. Cl. ..... 73/3; 73/196; 73/861.79

[58] Field of Search ..... 73/3, 195, 196, 73/861.84, 861.79, 861.77, 861.83

[56] References Cited

U.S. PATENT DOCUMENTS

| | | | |
|---|---|---|---|
| 2,859,616 | 11/1958 | Fellows . | |
| 3,053,086 | 9/1962 | Granberg | 73/230 |
| 3,060,074 | 10/1962 | Granberg | 73/230 |
| 3,083,570 | 4/1963 | Truman | 73/3 |
| 3,135,116 | 6/1964 | Kwong et al. . | |
| 3,201,987 | 8/1965 | Ackerman et al. | 73/231 |
| 3,241,366 | 3/1966 | Allen | 73/230 |
| 3,307,396 | 3/1967 | Griffo | 73/231 |
| 3,364,743 | 1/1968 | Clinton | 73/231 |
| 3,377,856 | 4/1968 | Haseegawa | 38/77.364 |
| 3,488,996 | 1/1970 | Pfrehn . | |
| 3,604,265 | 9/1971 | Wilson et al. | 73/231 |
| 3,623,835 | 11/1971 | Boyd | 73/231 |
| 3,695,106 | 10/1972 | Gelsow | 73/231 |
| 3,707,872 | 1/1973 | Masson et al. | 73/231 |
| 3,710,622 | 1/1973 | Hammond et al. | 73/861.84 |
| 3,735,637 | 5/1973 | Penet | 73/231 |
| 3,788,142 | 1/1974 | Goransson | 73/230 |
| 3,934,473 | 1/1976 | Griffo | 73/861.84 |
| 3,958,447 | 5/1976 | Baker et al. | 73/196 |
| 4,067,230 | 1/1978 | Ball . | |
| 4,091,653 | 5/1978 | Lee | 73/3 |
| 4,286,471 | 9/1981 | Lee | 73/861.84 |
| 4,305,281 | 12/1981 | Lee et al. | 73/195 |
| 4,463,613 | 8/1984 | Schmittner et al. | 73/861.83 |
| 4,534,226 | 8/1985 | Rose | 73/861.84 |
| 4,566,307 | 1/1986 | Boykin . | |
| 4,694,681 | 9/1987 | Hoffmann | 73/3 |

FOREIGN PATENT DOCUMENTS

| | | |
|---|---|---|
| 4316584 | 6/1966 | Japan . |
| 0978664 | 3/1961 | United Kingdom . |

OTHER PUBLICATIONS

Rockwell International, Auto–Adjust Turboo–Meters for Accurate Gas Measurement, Apr. 1988.

*Primary Examiner*—Harshad Patel
*Attorney, Agent, or Firm*—Wood, Herron & Evans, LLP

[57] ABSTRACT

Methods and an apparatus for measuring gas flow with greater reliability than earlier single-rotor and double-rotor turbine meters and dual turbine meter systems are disclosed. The apparatus comprises two independent rotors, in close proximity of each other, housed in the same meter body, but isolated from the effects of each other. No pressure and temperature correction are needed for accuracy performance comparison between the two rotors. Because of the two rotor averaging technique, the reliability of the volume totalization is greatly improved over earlier double-rotor and single-rotor designs.

44 Claims, 8 Drawing Sheets

TANDEM ROTOR TURBINE METER AND FIELD CALIBRATION MODULE

Matter enclosed in heavy brackets [ ] appears in the original patent but forms no part of this reissue specification; matter printed in italics indicates the additions made by reissue.

This is a continuation of [copending] application Ser. No. 07/788,826 filed on Nov. 7, 1991, *now abandoned.*

BACKGROUND OF THE INVENTION

1. Field of the Invention

This invention relates to methods and an apparatus for measuring gas flow in a pipeline. More particularly, it relates to a tandem rotor turbine meter and field calibrator module which comprises a second independent metering rotor placed behind or downstream of an existing or main independent metering rotor and separated from it by flow conditioning stator vanes. There are two operation modes for this apparatus: the first being continuous operation as a tandem rotor turbine meter and the second being periodic use as a field calibrator module.

2. Prior Art

Following World War II, the construction of high pressure, interstate natural gas pipelines increased the need for accurate and reliable measurement devices for measuring large volumes of gas flow in a pipeline. The shortcomings of the traditional orifice meter were overcome with the development of gas turbine meters. Turbine meters provide great rangeability, compact size, and simplified maintenance when compared to alternative methods of large volume measurement. Single and double-rotor turbine meters as well as dual turbine meter systems are currently commercially available, each of which have drawbacks peculiar to their operation. For example, single-rotor turbine meters are not well adapted to provide accurate measurement in gas flow streams with non-uniform velocity profiles or with mechanical degradation of the rotor. Existing double-rotor turbine meters either do not have their rotors close enough together such that temperature and pressure corrections are required due to different flow conditions at each of the rotors; or in the case where they are in close proximity of each other, an example of which is shown in FIG. 1, the first rotor 1 affects the output of the second rotor 2 and thus two sets of independent output are not available. The two rotors 1 and 2 can be contained within the same meter body and module housings 3 and 3'. Rotor 1 is preceded by stator vanes 4. Between rotors 1 and 2 is a thrust balancing plate 5 whose function is to separate the rotors thereby balancing the axial thrust load on rotor 1. The force of the flow impinging upon the blades of rotor 1 causes a downstream force. The flow of gas over the hub of the thrust balancing plate creates a dynamic back pressure force counteracting the axial thrust.

In the prior art system, the rotor 1 operates in a manner similar to a single rotor meter because it actually measures the gas that passes through the line. The gas actually turns the rotor and then, through a mechanical gearing, that motion is transmitted out through a magnetic coupling to an output coupling to which the instrumentation is mounted. The output coupling is calibrated to represent a predetermined number of cubic feet per revolution thus generating a reading. In addition to rotor 1, there is a second rotor 2 whose function is to sense any change in direction of the gas velocity vector exiting from the blades of rotor 1. These two rotors therefore are fluidly coupled. The term fluid as used by those skilled in the art and as used throughout this specification shall mean both liquids and gas. If the first rotor is affected by fluid friction or mechanical friction, as in the running gear itself, the second or "sensing" rotor can sense this by the gas velocity vector angle change at which the flow leaves the tip of the first rotor's trailing edge and will change speed accordingly. The pulse output from both the rotors, taken together (via complex mathematical equations), indicate the true flow of fluid in the pipeline. For example, if a swirl of fluid is coming down the pipeline, it may hit the blades of the first rotor at such an angle that the rotor will give a reading that may indicate a higher flow rate than the actual flow rate in the pipeline. The rotational speed of the rotors (rpms) is a function of the actual vector velocity of the fluid. If the fluid enters the meter at an angle, the first rotor will be misled. However, the second rotor is designed to distinguish between the velocity of the fluid flowing through the pipeline and the velocity of fluid flow which comes off the trailing edges of the blades of the first rotor. Using the two rotor rotational speeds, a computer program calculates a ratio and adjusts the output at all times. Specific examples of various types of turbine meters are described in the following patents.

An example of an insertion type turbine meter is disclosed in U.S. Pat. No. 4,566,307 ('307 patent), entitled "Pipeline Flow Measurement Proving System". By way of background, an insertion turbine meter is a mechanical device used to measure the flow of gas or liquid through a pipe of known internal diameter. It has a small turbine rotor mounted on the end of a long stem. The diameter of the rotor is significantly smaller than the internal diameter of the pipe. The rotor and stem are inserted through a port in the side of the pipe. The rotor is positioned at the approximate center of the pipe and oriented in-line with the pipe axis. The speed of the gas flow causes the turbine rotor to spin. The rotational speed of the turbine rotor is proportional to the local velocity of the gas. Typically, an electronic pickup or pulse is used to sense the speed of the rotor or to count its revolutions. This output is then factored by a multiplier based on the internal diameter of the pipe to obtain a reading of total flow volume. The two meters used in the '307 patent are separated by a distance of about 25 feet in an attempt to eliminate the influence of one meter on the other. Such a separation requires pressure and temperature correction between the two rotors for output totalization and accuracy performance. In addition, insertion turbines are not as accurate as full pipeline turbine meters. Insertion turbine meters are not as accurate because they do not measure the entire flow passing through the pipeline. Therefore, in order to obtain the correct reading of average flow velocity, the orientation and position within the pipe is critical. This also limits the useful range of the insertion turbine meter since the location of the average flow velocity does change between laminar and turbulent flows. Also, the presence of the insertion turbine meter disturbs the flow profile. Due to their small size, the insertion turbine meter can not incorporate flow conditioners ahead of the rotor. Thus, their accuracy is affected by flow disturbances. Their calibration accuracy is also affected by the actual internal pipe diameter. Their typical accuracy is ±2% or more as compared to ±1% error for full flow turbine meters.

An example of double rotor apparatus is disclosed in U.S. Pat. No. 2,859,616, entitled "Mass Flow Meter", in which the rotors are not in close proximity of one another and thus likewise require pressure and temperature correction between the two rotors for output totalization and accuracy performance. It does disclose the summary of two electronic signals from each rotor, however, one output does not check the other.

U.S. Pat. No. 4,286,471, entitled "Constant Accuracy Turbine Meter" by Lee et al discloses a turbine meter in which a sensing rotor downstream from the metering rotor senses changes in the exit angle of the fluid leaving the metering rotor, the output from the sensing rotor being combined with the output from the metering rotor to produce a corrected output indicative of the flow through the meter. The output from the sensing rotor is utilized through a closed loop feedback system to modify the operation of the metering rotor in accordance with variations in the exit angle of the fluid leaving the metering rotor. The two rotors must rotate in the same direction.

The metering system disclosed in U.S. Pat. No. 4,305,281, entitled "Self-Correcting Self-Checking Turbine Meter" by Lee et al is very similar to that disclosed in U.S. Pat. No. 4,286,471 in that it likewise discloses a turbine meter in which a sensing rotor downstream from the metering rotor senses changes in the exit angle of the fluid leaving the metering rotor (thus the rotors are fluid coupled), the output from the sensing rotor being combined with the output from the metering rotor to produce a corrected output indicative of the flow through the meter. The output from the sensing rotor and the output from the metering rotor may be compared to provide an indication of deviation from performance at calibration. Additionally, the two rotors must rotate in the same direction and are fluid coupled.

Thus all gas measuring devices known to date fail to provide a system in which two independent rotors are located close enough together to alleviate the need for temperature and pressure corrections resulting from differences in flow conditions at each rotor, while at the same time being isolated from the effects of each other.

Accordingly, it would be desirable to have two independent rotors, in close proximity of each other, housed in the same meter body, but isolated from the effects of each other. This arrangement would eliminate the need for pressure and temperature corrections due to differences in flow conditions at each rotor. It would also be desirable to have direct comparison of two rotor outputs thereby allowing continuous checking of the condition of each rotor. It is further desirable to have a system which allows accuracy testing of turbine meters in service over a broad flow range, and at actual operating conditions of fluid pressure, temperature, density, and fluid chemical composition.

SUMMARY OF THE INVENTION

The present invention comprises methods and an apparatus for measuring gas flow in a gas pipeline. The apparatus includes two independent rotors, in close proximity of each other, housed in the same meter body, but isolated from the effects of each other. There are two operation modes for this apparatus, the first being continuous operation as a tandem rotor turbine meter and the second being periodic use as a field calibrator module. The apparatus comprises a second independent or tandem metering rotor, placed behind or downstream of an existing or main independent metering rotor. This second independent metering rotor in the tandem rotor/field calibrator module 61, FIG. 7B may be the same size and blade pitch as the main independent metering rotor. It rotates in either the same or opposite direction and registers the same flow. Flow conditioning vanes are incorporated in the module housing ahead of the second rotor, which isolates the two rotors from the effects of each other. The apparatus is built and calibrated as a complete double rotor meter made up of two individual measuring modules which fit into the same meter body. The two individual measuring modules may also be built and calibrated separately and then can be paired up later for operation.

In a continuous operating mode, the tandem rotor module provides an electronic measurement output which is independent from the main rotor. This allows a direct comparison to the output of the main rotor at line conditions without the need for pressure and temperature corrections. Therefore, only simple electronics are needed for the continuous self-checking of the conditions of each rotor. The second rotor is more reliable than the main rotor since it is protected in its downstream location and it drives no mechanical output.

The second rotor can run at a slower speed than the main rotor, depending upon the pitch of the blade angle, thus further enhancing its service life. Also, if desired the second rotor, without mechanical output, could be used as the electronic output totalization for billing, with the main rotor providing mechanical backup and checking.

The output totalization of each of the two rotors can also be averaged together to lessen the effects of each rotor on accuracy degradation and provide a very reliable and accurate volume totalization.

The tandem rotor module is independent of the main rotor module due to the stator vanes between the two rotors. Therefore, the two rotors can be repaired and recalibrated separately by the user in the shop at atmospheric conditions or in the field at operating conditions. The main rotor and tandem rotor module 61, 62 of FIGS. 7A, B can be interchanged with other modules without factory recalibration.

In the periodic operating mode, as a field calibrator module, a stator and rotor arm placed in line with an existing rotor to check its calibration and operation periodically.

DESCRIPTION OF THE PREFERRED EMBODIMENTS

At the outset, the invention is described in its broadest overall aspects, with a more detailed description following. The continuous mode apparats of the present invention is comprised of three essential elements, a primary rotor followed by a tandem rotor which are separated by a stator, all of which are in the same meter body. The tandem rotor is close enough to the primary rotor, and the stator is designed such that no temperature and pressure corrections are required. The stator functions to condition the fluid flow ahead of the tandem rotor enabling the tandem rotor to measure the true gas flow in the pipeline as opposed to the gas flow affected by the primary rotor blades.

The field calibration module unit is nothing but, in its simplest terms, a module which includes a stator and a rotor adapted to be a tandem rotor when coupled to an existing single rotor measuring system already in place in a pipeline.

Figure 1:
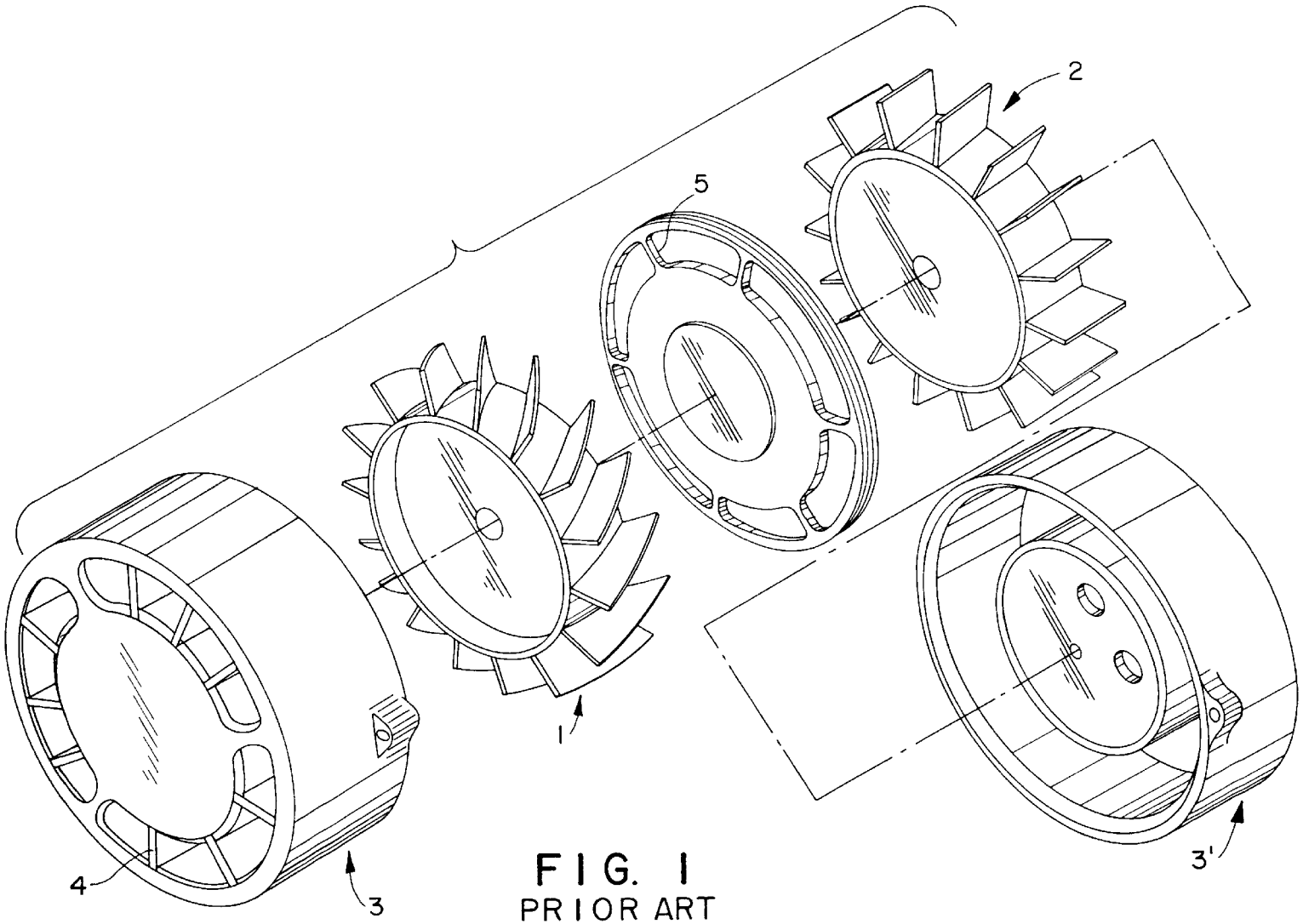
FIG. 1 PRIOR ART
FIG. 1 is an exploded perspective view of the prior art.
Figure 2:
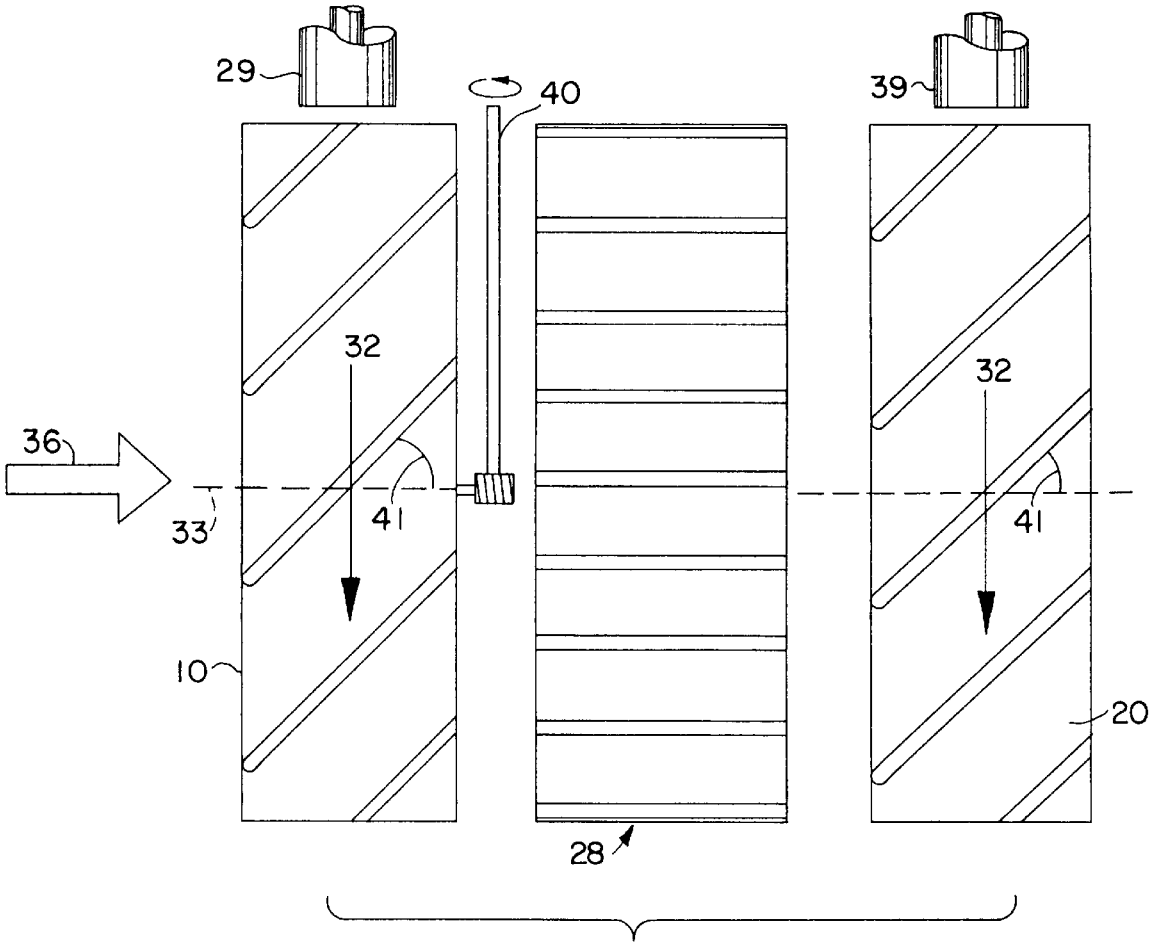
FIG. 2 is a schematic view of the two rotors and the stator vanes portions of the apparatus of the invention.
Figure 3:
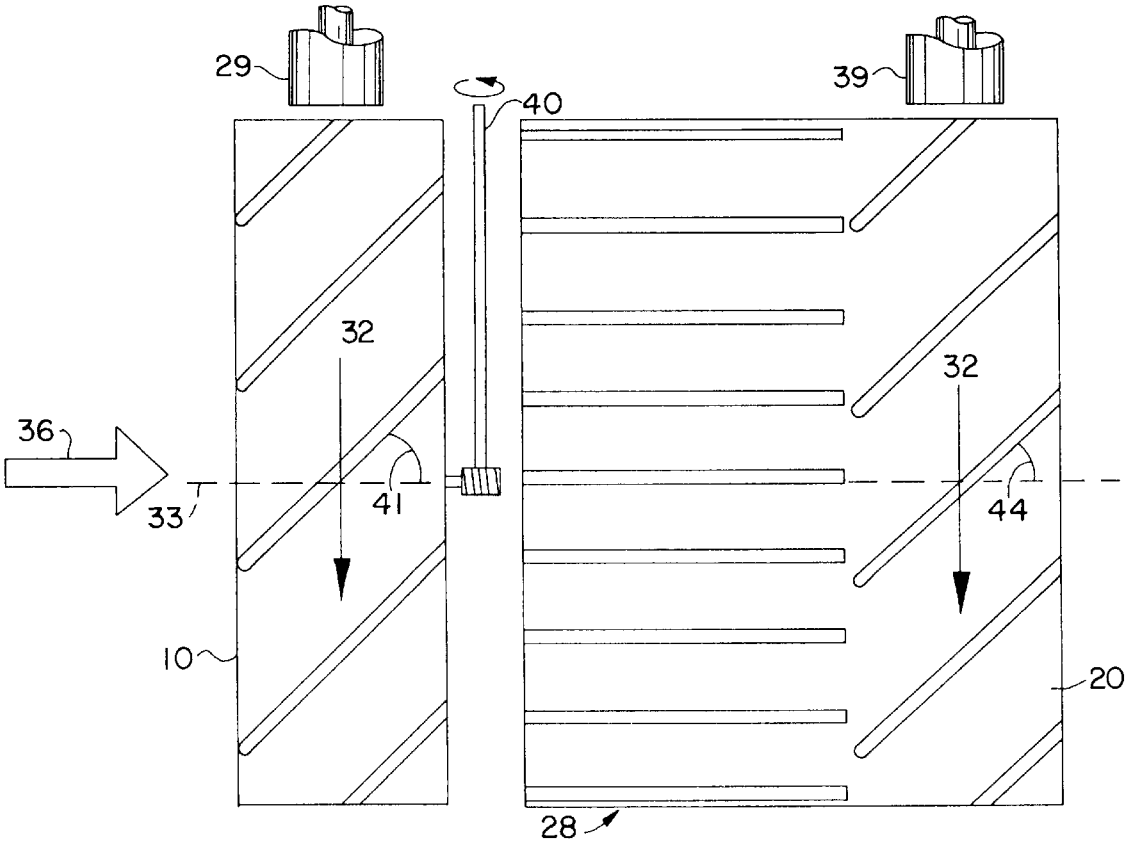
FIG. 3 is a schematic view of the two rotors and stator vanes portion of the apparatus of the invention where the stator vanes and the second rotor are in the same housing.
Figure 4:
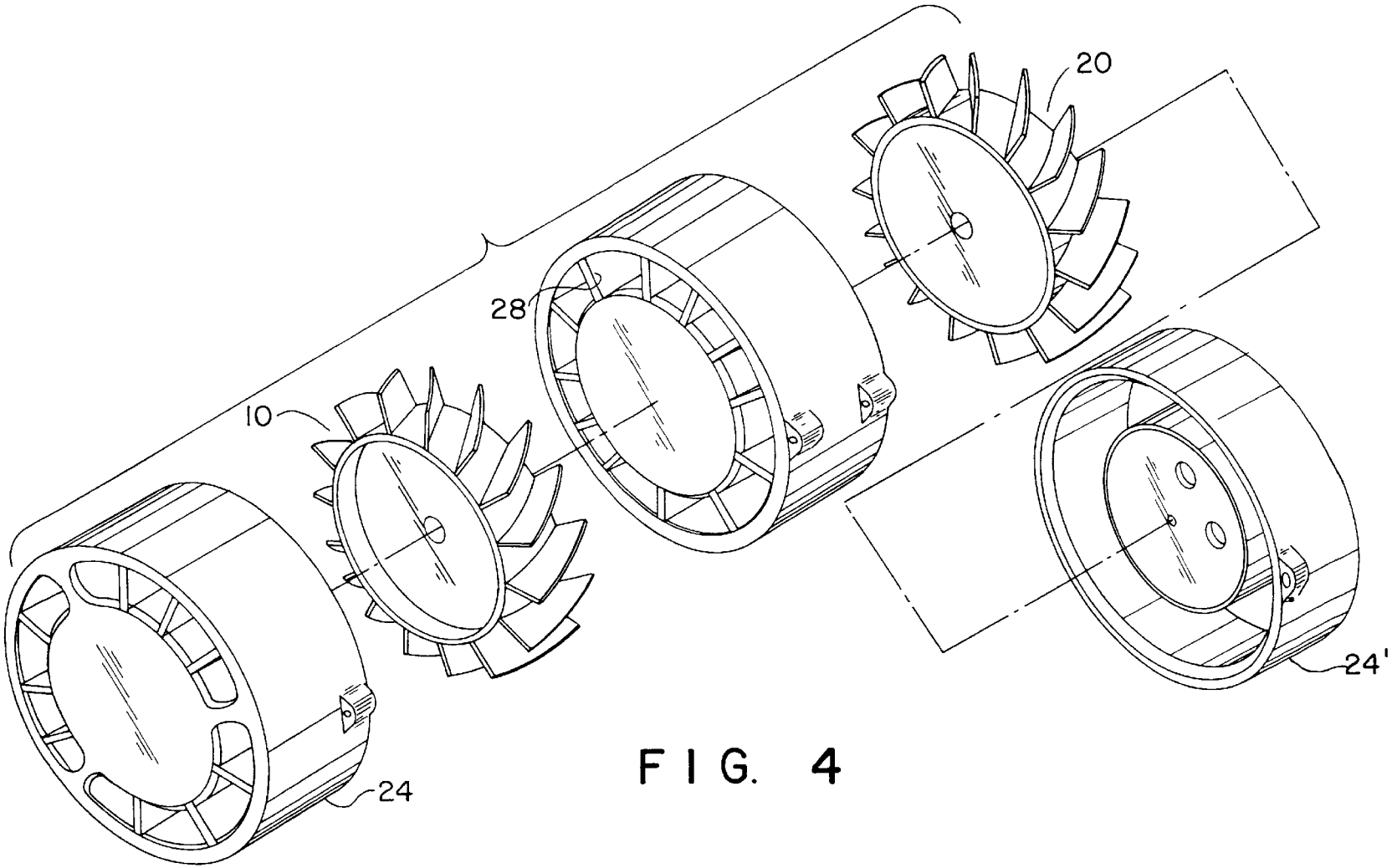
FIG. 4 is an exploded perspective view of the apparatus of the invention.

The following description will be a description of the continuous mode apparatus. In accordance with the present invention, two independent metering rotors 10 and 20, shown in FIGS. 2 and 4 are in close proximity of each other such that no temperature or pressure corrections are needed, and housed in the same meter body 60 of FIG. 7A and module housing 24 and 24', but isolated from the effects of each other by flow conditioning stator vanes 28 ahead of the second independent metering rotor 20. The first independent metering rotor 10 has spaced blades oriented to form a blade angle 41 with respect to its axis of rotation 33. The second independent metering rotor 20 may be the same size and blade pitch as the first or main independent metering rotor 10, or larger or smaller than first rotor; and its blade angle 44 or pitch, with respect to its axis of rotation 33 of said second independent metering rotor may be various pitch angles over a practical range of 1 to 75 degrees either in the same or opposite pitch direction. The second independent metering rotor 20 rotates in the same or opposite direction 32 about the same axis of rotation 33 and registers the same flow 36 as the first independent metering rotor 10. In between the first independent metering rotor and the second independent metering rotor are individual stator vanes 28 which are parallel to the pipeline. The stator vanes act to direct the flow of fluid coming off the first rotor in a straight line, parallel to the pipeline, as it flows through to the second rotor. The apparatus of the present invention is built and calibrated as a complete double rotor meter made up of two individual, independent measuring modules or rotors 10 and 20 and stator vanes 28 all of which fit into the same meter body and module housings 24 and 24'. Also shown in FIG. 2 and 3 is output means 29 which is actuated by the first independent metering rotor 10. Output means 39 is actuated by the second independent metering rotor 20. The two output means 29 and 39 provide electronic output signals representative of the gas flow through their respective independent metering rotor 10 and 20. Electronic pulse output is available from both rotors necessitating some type of electronic package. FIG. 5A shows a commercially available electronic package which allows the impulses generated by the instant invention to be read. The applicant is not claiming the electronics shown in FIG. 5A but is including them as an illustration of an available electronic devices that, with simple software changes, could be used for the Tandem Rotor and Field Calibrator Module of the instant invention.

In a continuous operating mode the second independent or tandem rotor 20 provides an electronic measurement output which is independent from the first or main independent metering rotor 10. This allows a direct comparison to the independent output of the first or main independent metering rotor 10 at line conditions without the need for pressure and temperature corrections.

Figure 5:
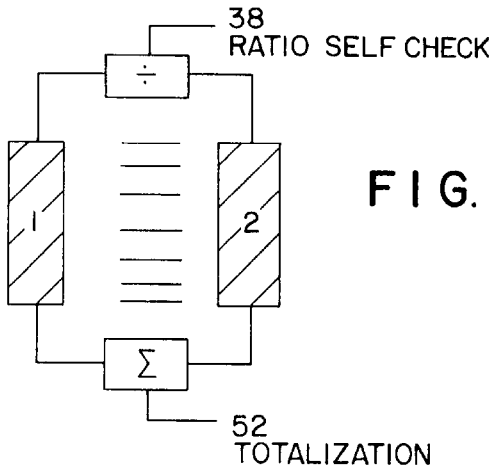
FIG. 5 is a schematic of a totalization and self check method that can be used with the operation of the rotors.
Figure 6:
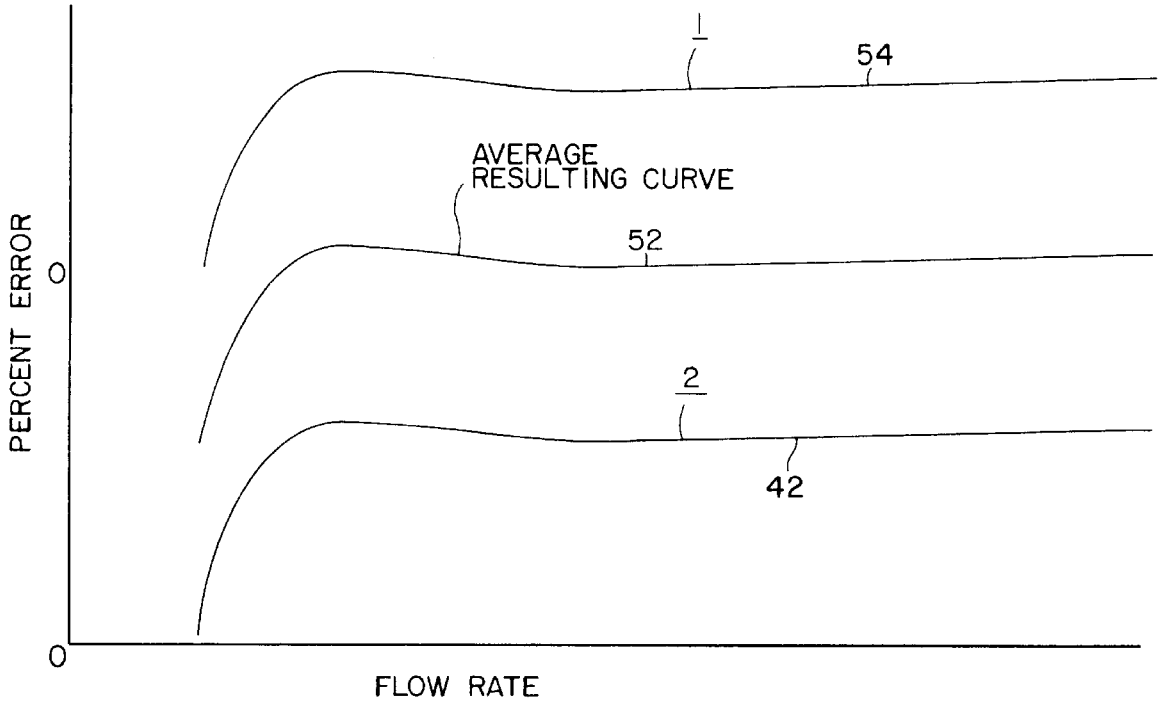
FIG. 6 is a graph of the data collected by the method shown in FIG. 5.
Figure 5A:
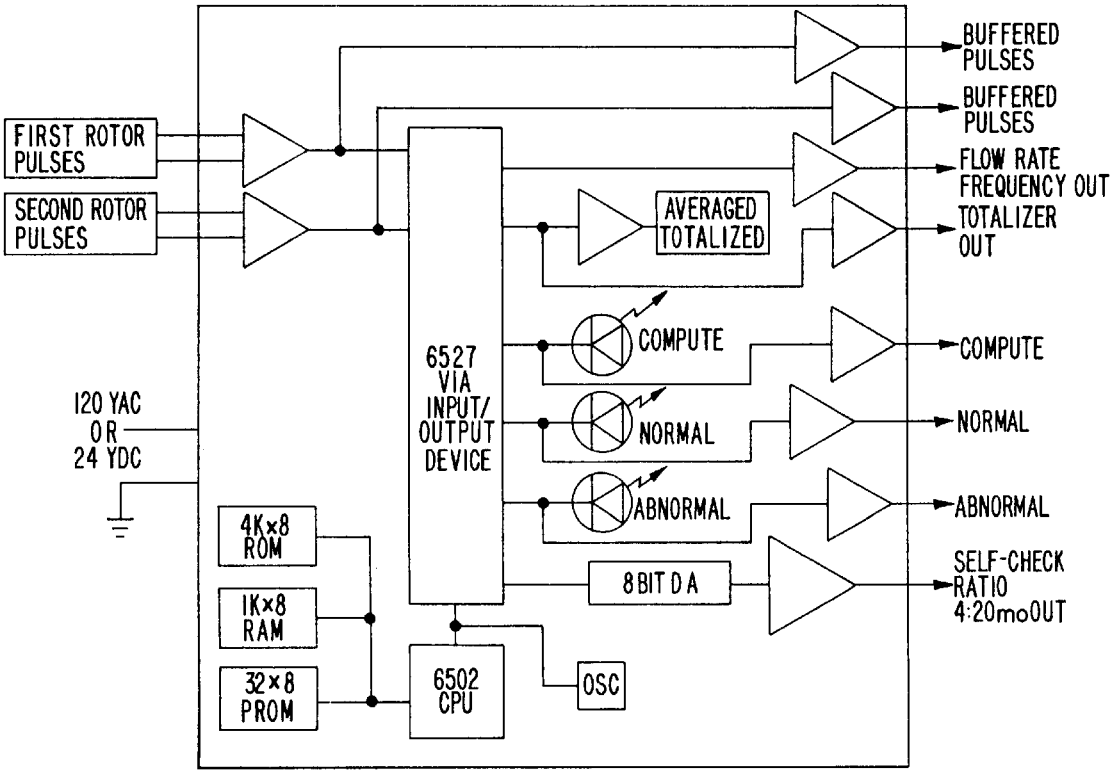
FIG. 5a is a schematic of a commercially available electronic device that can be used with this invention.

Therefore, as depicted in FIG. 5, only simple electronics 38 and 52 are needed for the continuous self-checking and totalization of the conditions of each independent metering rotor. The second independent metering rotor 20 is more reliable than the first or main independent metering rotor 10 since it is protected in its downstream location and it drives no mechanical output, unlike the first or main independent metering rotor 10 which does drive a mechanical output 40 as shown in FIGS. 2 and 3. This results in the mechanical curve 42 as shown in FIG. 6. The protected nature of the second independent metering rotor 20 also results in a longer service life.

The second independent metering rotor 20 can run at a speed equal to, less than or greater than the first or main independent metering rotor 10, depending upon the pitch of the blade angle or discrete angle 44, in FIGS. 2 and 3, with respect to the axis of rotation of the second independent metering rotor, thus further enhancing its service life. Also, if desired, the second independent metering rotor 20, without mechanical output, could be used as the electronic output totalization for billing, with the main metering rotor 10 providing mechanical backup and checking.

As depicted in FIGS. 5 and 6, the output totalization 42 and 54 of each of the two independent metering rotors can also be averaged together to lessen the effects of each rotor on accuracy degradation and to provide a very reliable volume totalization 52.

As seen in FIG. 2, the tandem rotor 20 is independent of the main metering rotor 10 due to the stator vanes 28 between the two rotors. Therefore, the two independent metering rotors 10 and 20 can be easily replaced and recalibrated separately by the user in the shop at atmospheric conditions or in the field at operating pressure. In addition, the main independent metering rotor, module 62 of FIG. 7A and tandem metering rotor module 61 can be interchanged with other modules without factory recalibration.

When being used as a field calibrator module, the current invention allows one to check the accuracy of the main rotor of a single rotor turbine meter. The accuracy of the meter being tested can be defined in the field at actual operating conditions, i.e., piping, pressure, temperature, gas specific gravity, over a broad flow range, without affecting the main meter rotor performance.

Field calibration allows the user to make on-site repairs or accuracy adjustments to a working meter. This eliminates the need for retrieving a spare module from a distant warehouse and returning the damaged module to the shop for calibration.

The majority of gas utilities can only perform shop calibration at atmospheric conditions, whereas the field calibrator gives gas utilities high pressure proving capability. Field calibration also permits estimated billing adjustments to be made accurately and quickly when a damaged meter is found.

The field calibrator can also be used to simplify in-shop calibration of turbine meters. No elaborate piping or proving system is required since no pressure and temperature correction is needed. A meter can be tested in its own body by simply installing the calibration module, attaching an inlet pipe, and blowing air through the meter.

Figure 7A:
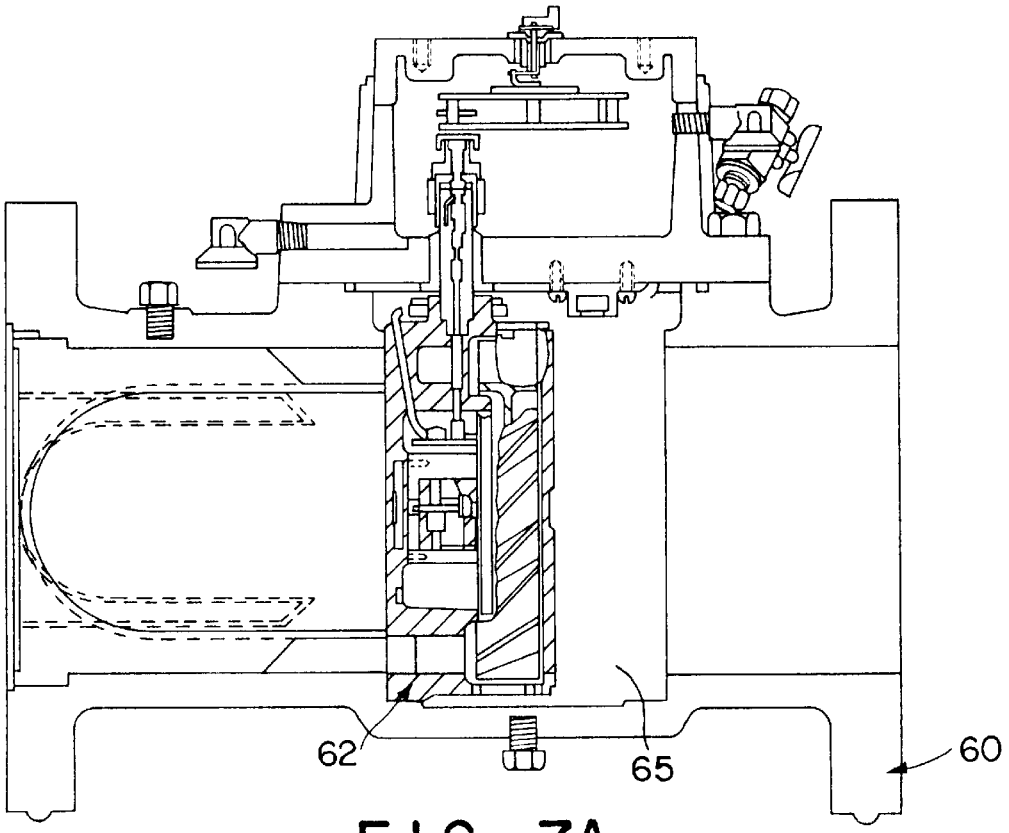
FIGS. 7A–C are a schematic of a turbine meter showing the single and double rotor options for Tandem rotor operation or single rotor operation with possibility of field calibration with field calibrator module.
Figure 7B:
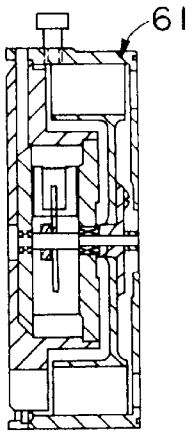
Figure 7C:
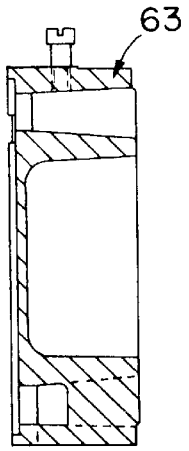
Figure 8B:
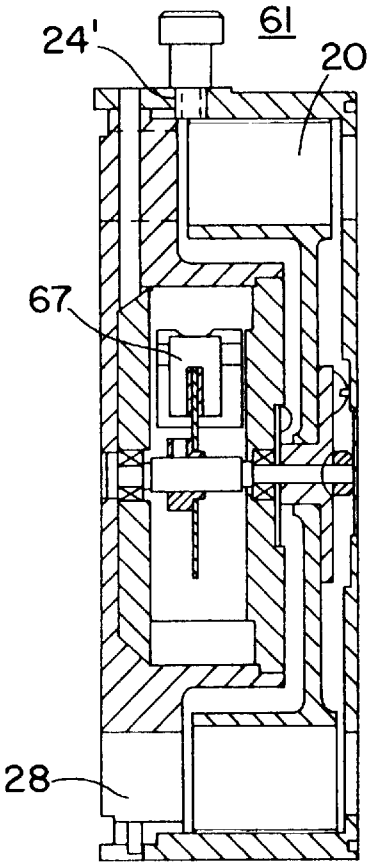
FIGS. 8A, B are two views of an enlarged sketch of on embodiment of the instant invention that can replace an existing single rotor turbine meter dummy housing for field calibration or for tandem rotor metering.
Figure 8A:
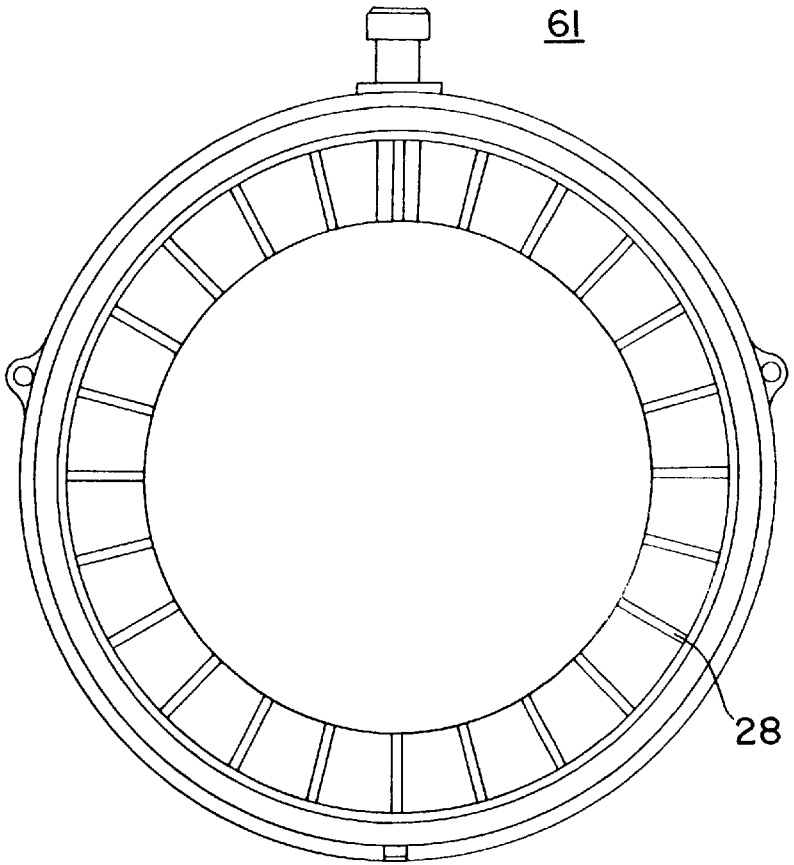

There is shown in FIGS. 8A,B two views of an enlarged sketch of a flow calibration module or tandem rotor metering module 61 that can replace the dummy housing 63. FIG. 7C, of a single rotor turbine meter. For a single rotor turbine meter the dummy housing is located in the area 65. FIG. 7A, adjacent to the main meter module 62. For tandem rotor metering, the flow or calibration module or tandem rotor metering module 61 is located in the area 65 adjacent to the main meter module 62. The flow calibration module or tandem rotor metering module 61 includes a housing 24', a rotor 20, flow isolation or conditioning vanes 28 and a pulser 67.

While the foregoing invention has been described with reference to its preferred embodiments, various alterations and modifications will occur to those skilled in the art. All such alterations and modifications are intended to fall within the scope of the appended claims.

What is claimed is:

1. A flow calibration module, that is removably installed in a [single rotor] turbine flow meter body, for use in periodic checking of a meter's flow measuring unit and for use in calibrating the flow measuring unit, the flow calibration module comprising:

a module housing;

a rotor mounted in said module housing so said rotor rotates about a rotational axis in response to gas passing therethrough from the meter's flow measuring unit;

flow conditioning means, disposed within said module housing upstream of said rotor, for conditioning gas flow to said rotor, wherein said flow conditioning means directs the gas flow from the meter's flow measuring unit to said rotor in a direction substantially parallel to the rotor's rotational axis to isolate said rotor from the flow measuring unit and wherein the conditioning of the gas has a negligible effect on the temperature and pressure of the gas flowing through the said flow conditioning means;

output signal means for providing a gas volume output signal representative of the gas volume flowing through said rotor; and wherein said module housing is configured so as to permit installation of said module housing in the meter's body downstream of and proximate to the meter's flow measuring unit for periodic checking and calibration of the flow measuring unit, where said module housing is disposed proximate to the meter's flow measuring unit so there is a negligible difference between the temperature and pressure of the gas flowing through the meter's flow measuring unit and of the gas flowing through said rotor.

2. The flow calibration module of claim 1, wherein said flow conditioning means further includes stator vanes for conditioning the gas flow to said calibration module rotor.

3. The flow calibration module of claim 1, wherein said flow conditioning means is incorporated into said module housing to form a unitary structure that both conditions gas flow to and rotatably supports said calibration module rotor.

4. The flow calibration module of claim 2, wherein said stator vanes are incorporated into said module housing to form a unitary store that both conditions gas flow to and rotatably supports said calibration module rotor.

5. The flow calibration module of claim 4, wherein said calibration module is installed in the meter body when the meter is in-service so performance checking and calibration of the meter's flow measuring unit is done under normal gas transmission line operating conditions.

6. The flow calibration module of claim 3, wherein the meter's flow measuring unit further includes a single rotor rotatably mounted in the meter body and wherein said module housing is adapted to be installed in the meter body in close proximity to the measuring unit's rotor.

7. The flow calibration module of claim 6, wherein said module housing includes means for coupling the meter's flow measuring unit and said module housing, wherein there is a negligible difference between the temperature and pressure of the gas flowing through the measuring unit's rotor and of the gas flowing through said calibration module rotor when said module housing is coupled to the meter's flow measuring unit.

8. The flow calibration module of claim 4, wherein a gas flow measurement inaccuracy is associated with the negligible difference between the temperature and pressure of the gas flowing through the measuring unit's rotor and of the gas flowing through said calibration module rotor and the negligible effect on gas temperature and pressure by said flow conditioning means and wherein the flow measurement inaccuracy does not affect a specified measurement accuracy for the flow calibration module.

9. The flow calibration module of claim 8, wherein the flow measurement inaccuracy is less than the specified flow calibration module's measurement accuracy.

10. The flow calibration module of claim 8, wherein said calibration module's measurement accuracy is ±1%.

11. The flow calibration module of claim 5 wherein said calibration module remains in-line for periodic checking of the meter's flow measuring unit by comparing a gas flow volume measured by the meter's measuring unit and a gas flow volume measured by said calibration module rotor.

12. The flow calibration module of claim 6 wherein said calibration module rotor includes a plurality of blades each having a blade angle, said blade angle being 1 (one) to 75 (seventy-five) degrees with respect to said calibration module rotor's axis of rotation.

13. The flow calibration module of claim 6 wherein said output signal means is an electric pulse producing means for producing pulses commensurate with the amount of rotation of said calibration module rotor.

14. The flow calibration module of claim 6, wherein said calibration module is installed in the meter body so the performance checking and calibration of the meter's flow measuring unit is done under shop testing and calibration conditions.

*15. A rotor turbine flow module that is removably installed in a turbine flow meter body having a flow measuring unit including a rotor, the rotor turbine flow module comprising:*

*a module housing;*

*a rotor mounted in said module housing so said rotor rotates about a rotational axis in response to gas passing therethrough from the meter's flow measuring unit;*

*flow conditioning means, disposed within said module housing upstream of said rotor, for conditioning gas flow to said rotor, wherein said flow conditioning means directs the gas flow from the meter's flow measuring unit to said rotor in a direction substantially parallel to the rotor's rotational axis to isolate said rotor from the flow measuring unit and wherein the conditioning of the gas has a negligible effect on the temperature and pressure of the gas flowing through the said flow conditioning means;*

*output signal means for providing a gas volume output signal representative of the gas volume flowing through said rotor; and*

*wherein said module housing is configured so as to permit installation of said module housing in the meter's body downstream of and proximate to the meter's flow measuring unit, and wherein said module housing is disposed proximate to the rotor of the flow measuring unit so there is a negligible difference between the temperature and pressure of the gas flowing through the meter's flow measuring unit and of the gas flowing through said rotor.*

*16. The rotor turbine flow module of claim 15, wherein said flow conditioning means further includes stator vanes for conditioning the gas flow to said module rotor.*

*17. The rotor turbine flow module of claim 16, wherein said stator vanes are incorporated into said module housing to form a unitary structure that both conditions gas flow to and rotatably supports said module rotor.*

*18. The rotor turbine flow module of claim 17, wherein said module is installed in the meter body when the meter is in-service for operation under normal gas transmission line operating conditions.*

*19. The rotor turbine flow module of claim 18, wherein said module remains in-line for operation.*

*20. The rotor turbine flow module of claim 17, wherein a gas flow measurement inaccuracy is associated with the negligible difference between the temperature and pressure of the gas flowing through the measuring unit's rotor and of the gas flowing through said module rotor and the negligible effect on gas temperature and pressure by said flow conditioning means and wherein the flow measurement inaccuracy does not affect a specified measurement accuracy for the flow module.*

*21. The rotor turbine flow module of claim 20, wherein the flow measurement inaccuracy is less than the specified flow module's measurement accuracy.*

*22. The rotor turbine flow module of claim 20, wherein said module's measurement accuracy is ±1%.*

*23. The rotor turbine flow module of claim 15, wherein said flow conditioning means is incorporated into said module housing to form a unitary structure that both conditions gas flow to and rotatably supports said module rotor.*

*24. The rotor turbine flow module of claim 23, wherein said module housing includes means for coupling the meter's flow measuring unit and said module housing, wherein there is a negligible difference between the temperature and pressure of the gas flowing through the measuring unit's rotor and of the gas flowing through said module rotor when said module housing is coupled to the meter's flow measuring unit.*

*25. The rotor turbine flow module of claim 23, wherein said module rotor includes a plurality of blades each having a blade angle, said blade angle being 1 (one) to 75 (seventy-five) degrees with respect to said module rotor's axis of rotation.*

*26. The rotor turbine flow module of claim 23, wherein said output signal means is an electric pulse producing means for producing pulses commensurate with the amount of rotation of said module rotor.*

*27. The rotor turbine flow module of claim 23, wherein said module is installed in the meter body.*

*28. A method of measuring gas flow along a gas flow path through a meter body comprising:*

*flowing the gas over an upstream rotor in the meter body at a first temperature and pressure so as to cause the upstream rotor to rotate as the gas flows along the gas flow path;*

*measuring gas flow correlated to the rotation of the upstream rotor;*

*flowing the gas over a downstream rotor in the meter body so as to cause the downstream rotor to rotate as the gas flows along the gas flow path, the downstream rotor being rotatable independently of the upstream rotor;*

*spacing the downstream rotor from the upstream rotor by a sufficiently small distance that the gas flows over the downstream rotor at substantially the first temperature and pressure;*

*after flowing the gas over the upstream rotor and before flowing the gas over the downstream rotor, flowing the gas over stator vanes to decouple the rotors from the effects of the gas flowing along the gas flow path such that rotation of the downstream rotor is independent of the rotation of the upstream rotor; and*

*measuring gas flow correlated to the rotation of the downstream rotor.*

*29. The method of claim 28 further comprising providing the upstream rotor with blades at a first pitch whereby to cause the upstream rotor to rotate in a first direction and at a first velocity as the gas flows along the gas path, and providing the downstream rotor with blades at a second pitch whereby to cause the downstream rotor to rotate in a second direction and at a second velocity as the gas flows along the gas flow path.*

*30. The method of claim 29 further comprising orienting the blades of the rotors such that the first direction equals the second direction whereby the rotors both rotate in the same direction as the gas flows along the gas flow path.*

*31. The method of claim 29 further comprising orienting the blades of the rotors such that the first direction and second direction are opposite whereby the rotors rotate in opposite directions as the gas flows along the gas flow path.*

*32. The method of claim 29 further comprising orienting the blades of the rotors such that the first velocity is equal to the second velocity.*

*33. The method of claim 29 further comprising orienting the blades of the rotors such that the first velocity is not equal to the second velocity.*

*34. A tandem rotor turbine meter for measuring flow of gas comprising:*

*a meter body having an inlet end through which said gas flows into the meter body and an outlet end through which said gas flows out of the meter body, the meter body defining a gas flow path between the inlet and outlet ends;*

*an upstream rotor in the meter body communicating to the inlet end and having blades in the gas flow path at a first pitch so as to cause the upstream rotor to rotate as said gas flows along the gas flow path, wherein said gas flowing over the blades of the upstream rotor is at a first temperature and a first pressure;*

*a first measuring device coupled to the upstream rotor for measuring gas flow correlated to the rotation of the upstream rotor;*

*a downstream rotor in the meter body communicating to the outlet end and having blades in the gas flow path at a second pitch so as to cause the downstream rotor to rotate as said gas flows along the gas flow path, the downstream rotor being rotatable independently of the upstream rotor, the downstream rotor being spaced from the upstream rotor;*

*a second measuring device coupled to the downstream rotor for measuring gas flow correlated to the rotation of the downstream rotor; and*

*a plurality of elongated stator vanes interposed along the gas flow path between the upstream and downstream rotors, the stator vanes having a length sufficient to decouple the blades of the rotors from the effects of said gas flowing along the gas flow path while spacing between the rotors is small enough such that said gas flowing over the blades of the downstream rotor is at substantially the first temperature and the first pressure.*

*35. The meter of claim 34 wherein the first pitch causes the upstream rotor to rotate in a first direction as said gas flows along the gas flow path and the second pitch causes the downstream rotor to rotate in a second direction as said gas*

*flows along the gas flow path, the first direction being equal to the second direction whereby the rotors both rotate in the same direction as said gas flows along the gas flow path.*

*36. The meter of claim 34 wherein the first pitch causes the upstream rotor to rotate in a first direction as said gas flows along the gas flow path and the second pitch causes the downstream rotor to rotate in a second direction as said gas flows along the gas flow path, the first direction being opposite to the second direction whereby the rotors rotate in opposite directions as said gas flows along the gas flow path.*

*37. The meter of claim 34 wherein the first pitch causes the upstream rotor to rotate at a first velocity as said gas flows along the gas flow path and the second pitch causes the downstream rotor to rotate at a second velocity as said gas flows along the gas flow path, the first velocity being equal to the second velocity.*

*38. The meter of claim 34 wherein the first pitch causes the upstream rotor to rotate at a first velocity as said gas flows along the gas flow path and the second pitch causes the downstream rotor to rotate at a second velocity as said gas flows along the gas flow path, the first velocity being unequal to the second velocity.*

*39. The meter of claim 34 wherein the second pitch corresponds to a blade angle of between one and 75* degrees.

*40. A gas flow meter system comprising:*

*a meter body having a gas flow path therethrough between an inlet end and an outlet end;*

*a first rotor assembly in the meter body alone the gas flow path whereby to define an area between the first rotor assembly and the outlet end; and*

*a removable dummy housing in the area whereby a second rotor assembly may subsequently be inserted into the area in place of the dummy housing.*

*41. The gas flow meter system of claim 40 wherein the first rotor assembly is spaced adjacent to the inlet end.*

*42. The gas flow meter system of claim 40 wherein the dummy housing is spaced adjacent the outlet end.*

*43. A method of gas flow metering comprising:*

*flowing gas through a meter body having a gas flow path therethrough;*

*flowing gas through a first rotor assembly in the meter body along the gas flow path followed by flowing said gas through a dummy housing in the meter body along the gas flow path;*

*subsequently replacing the dummy housing with a second rotor assembly; and then*

*flowing gas through the first rotor assembly in the meter body along the gas flow path followed by flowing said gas through the second rotor assembly in the meter body along the gas flow path.*

*44. A method of modifying a gas flow meter system comprising:*

*providing a meter body having a gas flow path therethrough;*

*providing a first rotor assembly in the meter body along the gas flow path;*

*providing a dummy housing in the meter body along the gas glow path; and*

*subsequently replacing the dummy housing with a second rotor assembly along the gas flow path.*

* * * * *

UNITED STATES PATENT AND TRADEMARK OFFICE

CERTIFICATE OF CORRECTION

PATENT NO. : Re. 36,401

DATED : November 23, 1999

INVENTOR(S) : James J. Fitzpatrick and Daniel W. Peace

It is certified that error appears in the above-identified patent and that said Letters Patent is hereby corrected as shown below:

Column 4, line 65, please delete "apparats" and replace with --apparatus--;

Column 6, line 34, please delete "defined" and replace with --determined--;

Claim 4, column 7, line 48, please delete "store" and replace with --structure--;

Claim 40, column 11, line 28, please delete "alone" and replace with --along--.

Signed and Sealed this

Thirtieth Day of May, 2000

*Attest:*

Q. TODD DICKINSON

*Attesting Officer*

*Director of Patents and Trademarks*